United States Patent [19]
Nutto et al.

[11] Patent Number: 6,076,427
[45] Date of Patent: Jun. 20, 2000

[54] SECURING SYSTEM BETWEEN BICYCLE PEDAL AND SHOE OF THE USER

[76] Inventors: Uwe Nutto, Boelckestrasse 19, D-79100 Freiburg; Oliver Schiek, Niemensstrasse 6, D-79098 Freiburg, both of Germany

[21] Appl. No.: 09/277,048

[22] Filed: Mar. 26, 1999

Related U.S. Application Data

[63] Continuation of application No. PCT/DE96/01864, Sep. 28, 1996.

[51] Int. Cl.⁷ .................................................. G05G 1/14
[52] U.S. Cl. ................................. 74/594.6; 74/594.4
[58] Field of Search .................... 74/594.4, 594.6; D12/125; 482/57; 384/431

[56] References Cited

U.S. PATENT DOCUMENTS

| | | | |
|---|---|---|---|
| 4,599,915 | 7/1986 | Hlavac et al. | 74/594.4 |
| 4,686,867 | 8/1987 | Bernard et al. | 74/594.4 |
| 5,199,324 | 4/1993 | Sain | 74/594.4 |
| 5,423,233 | 6/1995 | Peyre et al. | 74/594.4 |
| 5,449,332 | 9/1995 | Hervig | 74/594.4 |
| 5,628,710 | 5/1997 | Hervig | 482/57 |

FOREIGN PATENT DOCUMENTS

| | | |
|---|---|---|
| 2 509 249 | 1/1983 | France . |
| 2 624 470 A1 | 6/1989 | France . |
| 32 18 290 A1 | 12/1982 | Germany . |

*Primary Examiner*—David A. Bucci
*Assistant Examiner*—Chong H. Kim
*Attorney, Agent, or Firm*—Akin, Gump, Strauss, Hauer & Feld, L.L.P.

[57] ABSTRACT

The invention relates to a bicycle pedal with a crank arm at whose radially outer end a pedal body is provided in the usual way. The latter, with respect to the crank arm, can rotate freely around a horizontal transverse axis (1) that runs perpendicularly to the crank arm, while the pedal body itself (2, 24, 25) can also pivot around a longitudinal axis (32) that runs in the direction of travel in a horizontal plane and that intersects the transverse axis (1). The pedal system also has first connecting elements (30, 35) that can be detachably connected to complementary second connecting elements provided on the shoe of a user. The longitudinal axis (32) running in the direction of travel of the bicycle and permitting rotation of the pedal lies either between the pedal body (2, 24, 25) and the first connecting elements (30, 35) or between the second connecting element and the shoe of the user.

4 Claims, 5 Drawing Sheets

SECURING SYSTEM BETWEEN BICYCLE PEDAL AND SHOE OF THE USER

CROSS-REFERENCE TO RELATED APPLICATION

This application is a continuation of International Application PCT/DE96/01864, filed Sep. 28, 1996, the disclosure of which is incorporated herein by reference.

BACKGROUND OF THE INVENTION

The invention relates to a securing system between bicycle pedal and shoe of the user, in which a pedal body is provided which, with respect to the crank arm of the bicycle, can rotate freely around a horizontal transverse axis that runs perpendicular to the crank arm, while the pedal body has at least one additional degree of freedom of movement with respect to the crank arm.

Such a bicycle pedal is known from DE 32 18 290 A1, which deals with a pedal training device that has several degrees of freedom of movement with respect to its crank arm. The pedal body is fastened to a ball that is supported by bearings in a hollow spherical shell.

A further bicycle pedal is known from FR 2 509 249, in which the pedal body can be pivoted around a horizontal axis running in the direction of travel and intersecting the transverse axis, and can be fixed. No pivoting in use is provided, however, because the pedals are intended to be permanently adjusted to the requirements of the user once and for all before being taken into use.

These known pedals have the disadvantage in use that they take no account of human biomechanics in the exercise of cycling in the sporting domain. This applies especially to that cycling known as mountain-bike cycling, particularly in hilly terrain, in which cyclists change to "seesaw" pedalling. The shoes of the cyclist are usually permanently connected to the pedal body through an appropriate take-up and latching couple. An alternative possibility is the use of common shoes, which are connected more or less permanently to the pedals via a foot cage. This rigid binding with the pedal body is necessary for the requisite optimal transmission of force. It has the disadvantage, however, that in "seesaw" pedalling, when the bicycle is positioned transversely with respect to a horizontal axis in the direction of travel, the upper body of the cyclist continues to be upright. Nevertheless, the feet of the cyclist are in a slanting position via the permanent and rigid shoe-pedal connection. Since the vertical alignment of the body is also taken up by the legs, it is the ankles of the cyclist that are in an anatomically incorrect position and transmit the tilting. This causes substantial stress to this part of the body, while this human transmission axis also reduces the effectiveness of the force employed by the cyclist.

SUMMARY OF THE INVENTION

On the basis of this state of the art, the task of the invention is to create a simple and economical securing system between bicycle pedal and shoe of the user that counteracts anatomically incorrect positions of the lower extremities, especially in the ankle area, even when "seesaw" pedalling is used, so that the forces employed are converted into pedal drive as fully as possible.

In the case of the securing system mentioned at the outset, the solution of this task in accordance with the present invention consists in the fact that the pedal body displays a first connecting element that can be detachably connected to a complementary second connecting element on the shoe of the user, and that the additional degree of freedom of movement is formed by a joint around a longitudinal axis running in the direction of travel, which is attached a) centrally in the pedal body, b) eccentrically in the pedal body—or c) on the sole of the shoe of the user.

The solutions stated here under a) and b) permit the use of common shoes provided with latching elements and are described in conjunction with FIGS. 3, 4 and 5 while the solution stated under c) requires the purchase of an appropriate shoe mechanism.

The ankle, knee and ligaments of the cyclist are effectively relieved of stress due to the fact that the pivoting around the longitudinal axis is also taken up in the pedal, especially when the cyclist leaves the saddle in "seesaw" pedalling and his weight essentially rests on the pedals.

DE 32 18 290 A1 describes in theory the possibility of transmitting the tilting necessary in "seesaw" pedalling from a human axis to a technical axis. That document, however, does not describe any theory for the conversion of this tilting, and the ball joint mentioned is unsuitable for this purpose.

Advantageous forms of implementation in accordance with the invention are distinguished in the subsidiary claims.

BRIEF DESCRIPTION OF THE SEVERAL VIEWS OF THE DRAWINGS

Three specimen models of the invention are described in more detail below with the aid of the diagrams. These show.

DETAIL DESCRIPTION OF THE INVENTION

Figure 1:
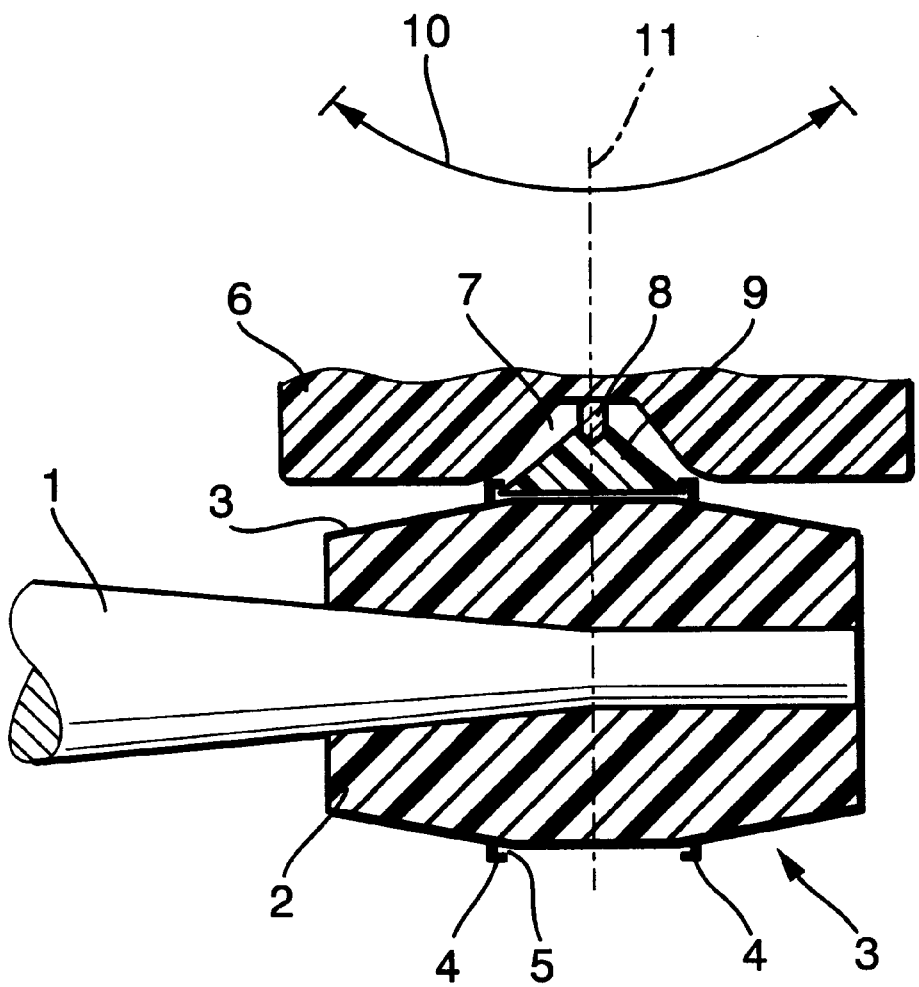
FIG. 1 a diagrammatic and partly sectional rear view of a pedal with a shoe set upon it, in accordance with a first specimen model of the invention, FIG. 2 a bottom view of a shoe for use with a pedal as shown in FIG. 1, FIG. 3 a partly sectional plan view of a pedal with shoe latches, in accordance with a second specimen model of the invention, FIG. 4 a sectional view of half of the central tube of the pedal shown in FIG. 3, FIG. 5 a plan view of a pedal with shoe latches, in accordance with a third specimen model of the invention.

FIG. 1 shows a partly sectional diagrammatic view of a pedal in accordance with a first specimen model of the invention, looking in the direction of travel.

The reference mark 1 distinguishes the pedal axis, which, in the usual way, is held on the radially outer end of the crank arm, which is not shown in the drawings. The pedal axis or transverse axis 1 runs vertically to the crank arm. A bearing, which, in order to simplify the drawing, is not shown, is provided on the transverse axis 1 for the pedal body 2, which can rotate freely around the transverse axis 1. The pedal body 2 corresponds to known pedal bodies, i.e. it displays two opposite symmetrical tread surfaces 3 on which the cyclist can set his foot.

Each of the tread surfaces 3, which have the same structure, has an enclosing arrangement 4. The latter can be structured in different ways. In a preferred form of implementation, the enclosing arrangement 4 consists of lateral rails, each of which displays a lateral guide slot 5, into which a corresponding edge of a shoe element can be inserted in positive engagement. Preferably, the rails are L-shaped in plan view and thus display a forward stop, so that the shoe is inserted into the rails from the rear and is then also fixed in the direction of travel. These rails can be interrupted and can be provided in several rail parts arranged in alignment.

Figure 2:
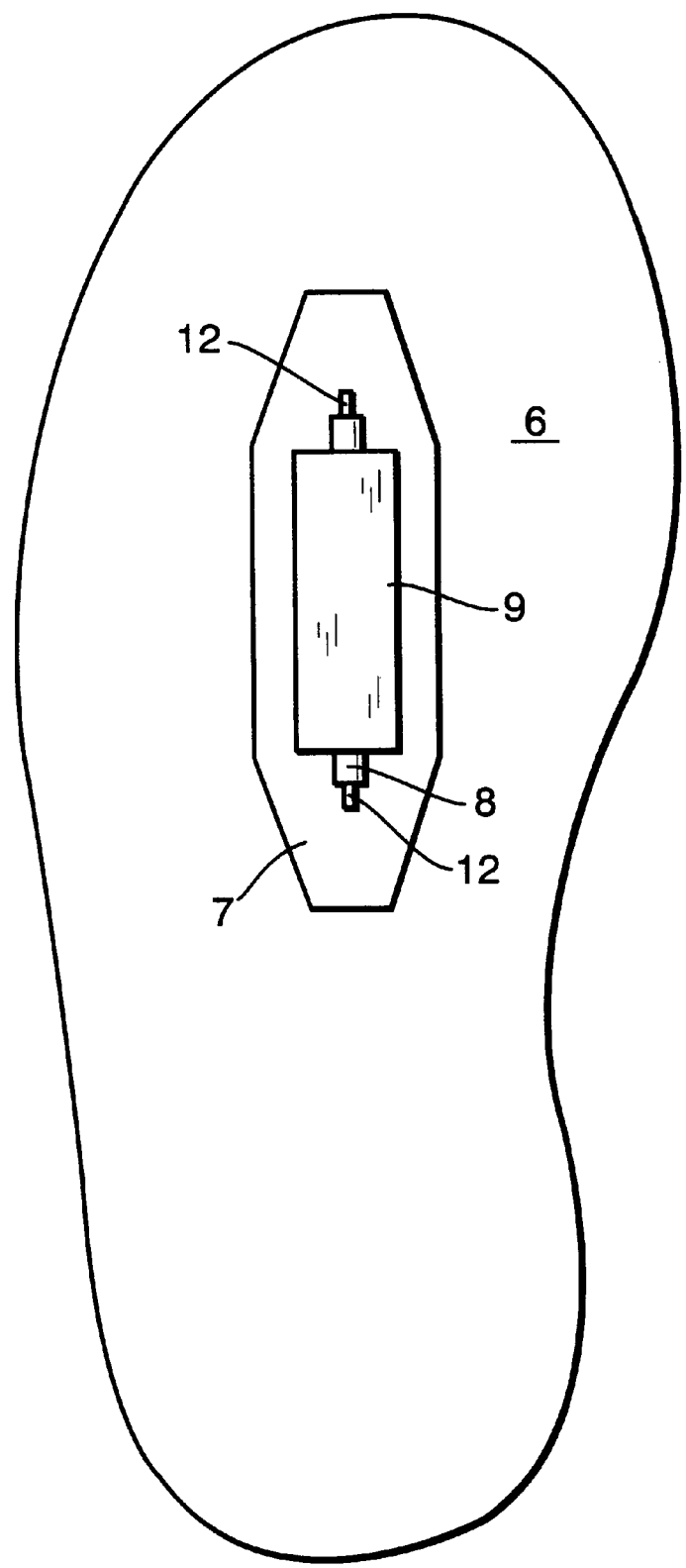

FIG. 1 further shows diagrammatically the sole of a shoe 6. Here it should be noted that the shoe 6 displays a central trough 7, which is preferably located in the area under the front ball of the foot, as can be seen in FIG. 2. In the central trough 7, which runs in the direction of the foot and thus in the direction of travel when the shoe 6 is used, a long pivoting element 8 is provided which, for one thing, is permanently fixed to the sole of the shoe 6 and to which a shoe plate 9 is fastened so that it can pivot. The shoe plate 9 also has connecting elements—such as lugs or rails—that are complementary in form to the rails 4.

In the specimen model shown, this shoe plate is a rectilinear three-sided prism 9 that is connected at its apex to the pivoting element B. The connection between prism 9 and shoe 6 can be implemented as a shaft here with the aid of a rod 12, shown in FIG. 2, which is led through corresponding drilled holes in the pivoting element 8 and in the prism 9. But any other method of connection may also be used. In particular, the sole 6 and the shoe plate 9 can also be made in one piece of synthetic material.

In the specimen model shown, a further advantage results from the fact that the shoe plate 9 does not project beyond the sole 6, so that a user can also travel on foot without ado.

Besides the prism form shown, the shoe plate 9 can also have a different shape, as long as it can be permanently but detachably connected to an enclosing arrangement of the pedal and permits lateral pivoting of the shoe 6 with respect to the shoe plate 9. The direction of pivoting is indicated with the arrow 10, which indicates a possibility of pivoting the shoe around the plane 11 running vertically to the drawing plate.

In an alternative form, it is not the shoe of the cyclist itself that takes up the pivoting element 8 but an additional shoe sole that the user of a bicycle fitted with such pedals draws over the shoes he is wearing at the time and/or secures to his shoe with ties.

FIG. 2 shows a bottom view of a shoe 6 for use with a pedal as shown in FIG. 1. The same characteristics are marked with the same reference marks in each case. The trough 7 can be clearly seen, in which two abutments of the pivoting element 8 are shown positioned opposite each other. Between the latter, the shoe plate 9 is inserted, the shoe plate 9 and pivoting element 8 being connected to each other via the rod 12 so that they can pivot. By means of a corresponding prolongation of the trough, this rod 12 can also be easily replaced if the connection should disengage, e.g. in the event of a fall.

Besides synthetic material, other materials, such as Kevlar or metal, are possible for the implementation of the connecting element. The pedal body 2 has the tread surfaces 3, which act as stops when the shoes 6, indicated only diagrammatically, are set on them while pivoting.

Figure 3:
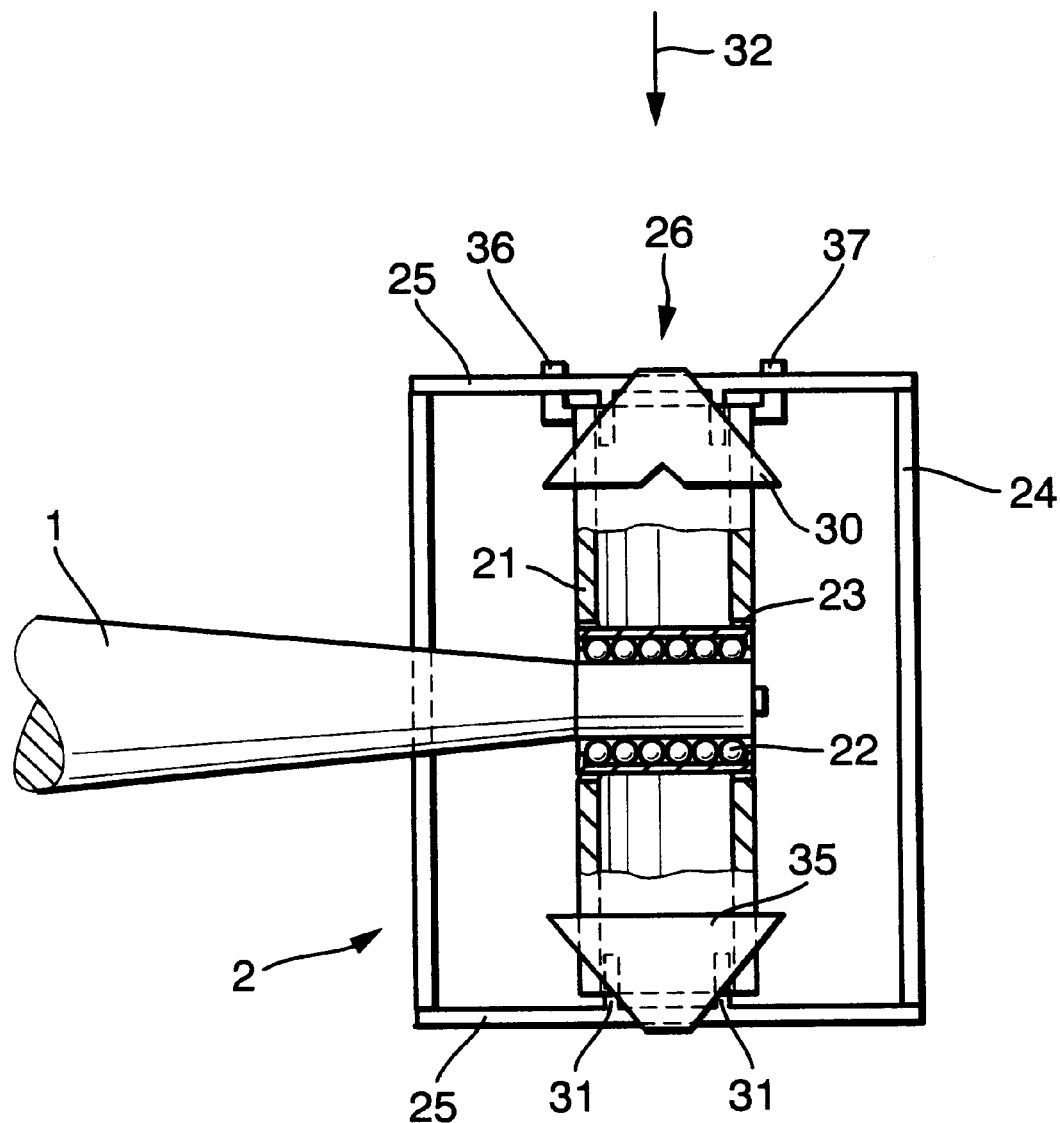

FIG. 3 shows a partly sectional plan view of a pedal with shoe latches, in accordance with a second specimen model of the invention, Here, too, reference mark 1 indicates the pedal axis, which, in the usual way, is linked to the radially outer end of the crank arm, not shown in the drawings, so that the pedal axis 1 is connected with torsion stiffness to the crank arm. The pedal axis or transverse axis 1 runs perpendicularly to the crank arm. A central tube 21, shown here running horizontally in the direction of travel, is supported by bearings on the transverse axis 1, a drilled hole 23 being aligned with the transverse axis to accept a ball bearing 22.

The central tube 21 can rotate freely around the transverse axis 1. The pedal body 2 itself corresponds with known pedal bodies, i.e. it displays two opposite symmetrical tread surfaces 24 on which the cyclist can set his foot. They are shown as outlines in FIG. 3.

Figure 4:
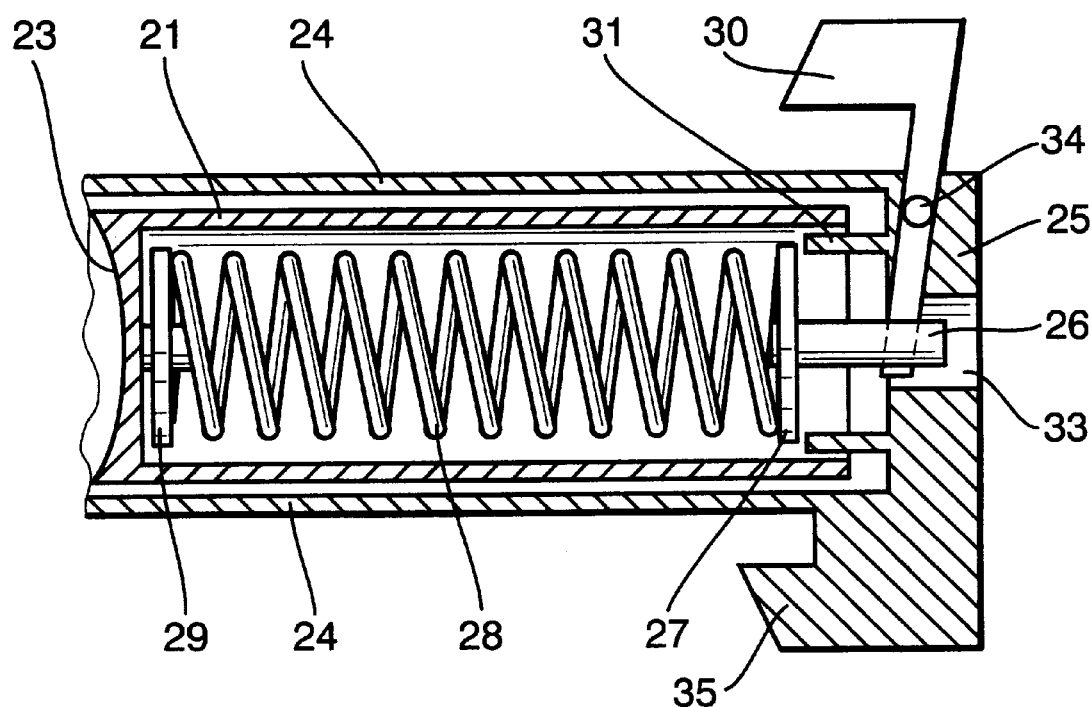

Each of the tread surfaces 24 has transverse strips 25 on which a securing arrangement 26 is provided centrally to the central tube 21. This securing arrangement is described in more detail in conjunction with FIG. 4. FIG. 4 shows a sectional view of half of the central tube 21 of the pedal shown in FIG. 3.

The transverse strips 25 have inside bearings 31 that project into the drilled holes in the central tube 21 opposite them. By this means, the pedal body 2 can rotate around the axis located in the direction of travel and indicated by the arrow 32. Here, the transverse strips 25 can be arranged at a distance from the central tube 21 or, as not shown in the drawings, can lie against the forward edges of the central tube 21.

The securing arrangement has, for example, a spindle 26, which is led through a drilled hole 33 in the transverse strip 25 and at whose end within the tube one of the ends 27 of a spring 28 is fastened. This spring 28 runs within the central tube 21, which is hollow as far as the central drilled hole 23, and is fastened at its other end 29 to the stated end of the central tube 21. On the transverse strip 25, a common locking clip 30 is provided that can move in the direction of travel via a bearing 34 and into which the heel of a shoe can thus be latched. On the opposite side of the clip 30, a fixed latch 35 is positioned on the transverse strip 25 to accept the toe of the shoe, so that the pedal can also be used if the pedal is used turned through 180 degrees. The latches 30 and 35 are complementary to corresponding arrangements provided on the shoes of the user of the bicycle.

Finally, stops 36 and 37 are provided that limit the lateral pivoting movement of the pedal body 2. For simplicity, these are shown only in FIG. 3, positioned at the upper end of the central tube 21 This is enough, even if a symmetrical design is preferred. The stop 36 prevents excessive tipping of the pedal 2 in the direction of the crank arm and the stop 37 prevents excessive tipping of the pedal 2 away from the bicycle and from the crank arm.

The following function of the spring 28 in interaction with the locking clip 30 thus results. The user of the bicycle latches his shoe into the clip and latches 30 and 35, first placing the toe of the shoe into the fixed forward latch 35 and then positioning the shoe permanently by latching the heel into the mobile latch 30. The possibility exists here of moving the latch 35 in the direction of the central tube 21 in order to be adjustable for different sizes of shoe. In this process the user overcomes the spring force of the spring 28. The latter can in turn be adjusted in size with the aid of the spindle 26. When the bicycle is being ridden, and particularly when "seesaw" pedalling is begun, forces arise that effect a pivoting of the pedal 2 with respect to the central tube 21. This is possible without further action because of the bearing of the strips 25 in the longitudinal drilled holes of the central tube 21. This pivoting, however, does not occur unbraked but takes place against the spring force of the two springs 28, since the transverse strips 25 and thus the pedal 2 are connected to these springs 28 via the mobile locking clip 30. The spring force is thus increased as pivoting increases and the transverse strips 25 of the pedal finally lie against the stated stops 36 and 37.

The possible spring forces are in themselves adjustable by the selection of the springs 28. In addition, there is a possibility of fine adjustment via the stated spindle 26 or some other arrangement that alters the spring path. The advantage of this pedal lies in the combination of two functions with few components, namely the functions of the latching-in of a shoe and resistance to pivoting of the pedals with only two springs facing the pedal bearing, each adjusted with only one screw.

This results in a pedal that allows the foot to move freely, while the cyclist, as far as the axes of his own body are concerned, can always apply his force perpendicularly to the pedal body and angling of the ankle or knee under load is prevented. By this means, even in the case of "seesaw" pedalling, the foot acts on the pedal surface without angling and thus the forces act directly on the pedal, so that no forces are lost from holding the foot in position or from other lateral vector forces. This elimination of the angling of the foot joint prevents excessive stresses on the knee and sinews, which represent a special problem for cyclists.

The modern pedal systems that are comparable with a safety binding are adjustable only with difficulty because of the lateral tensile forces, since the angling that is necessary there, and the resultant forces, are not intended to be enough to effect a release of the binding. The release point can be set much more precisely with the use of the pedals of this invention, since here a lateral twisting or pulling can only occur in the event of a fall or deliberate release in the case of a stop.

When the invention is designed, for example, for trials sport, the latches 30 and 35, also designated as connecting elements, which have been described in connection with the specimen models of FIGS. 3 to 5, can also be replaced, for example, by transversely running lugs or other elevations, which then have complementary troughs in the shoe soles facing them. These other connecting elements, which also result in positive engagement, have the advantage that the user of the pedal does not require to apply any release forces to dismount from the pedals, yet can exploit the advantage of tipping pedals in accordance with the invention. In a preferred design, the tread surface 3 is then kept concave, in which the slightly convex shoe 6 of the cyclist centres itself. In the case of these forms of implementation of the invention, the corresponding springs for creating a latching-in function are dispensed with.

Figure 5:
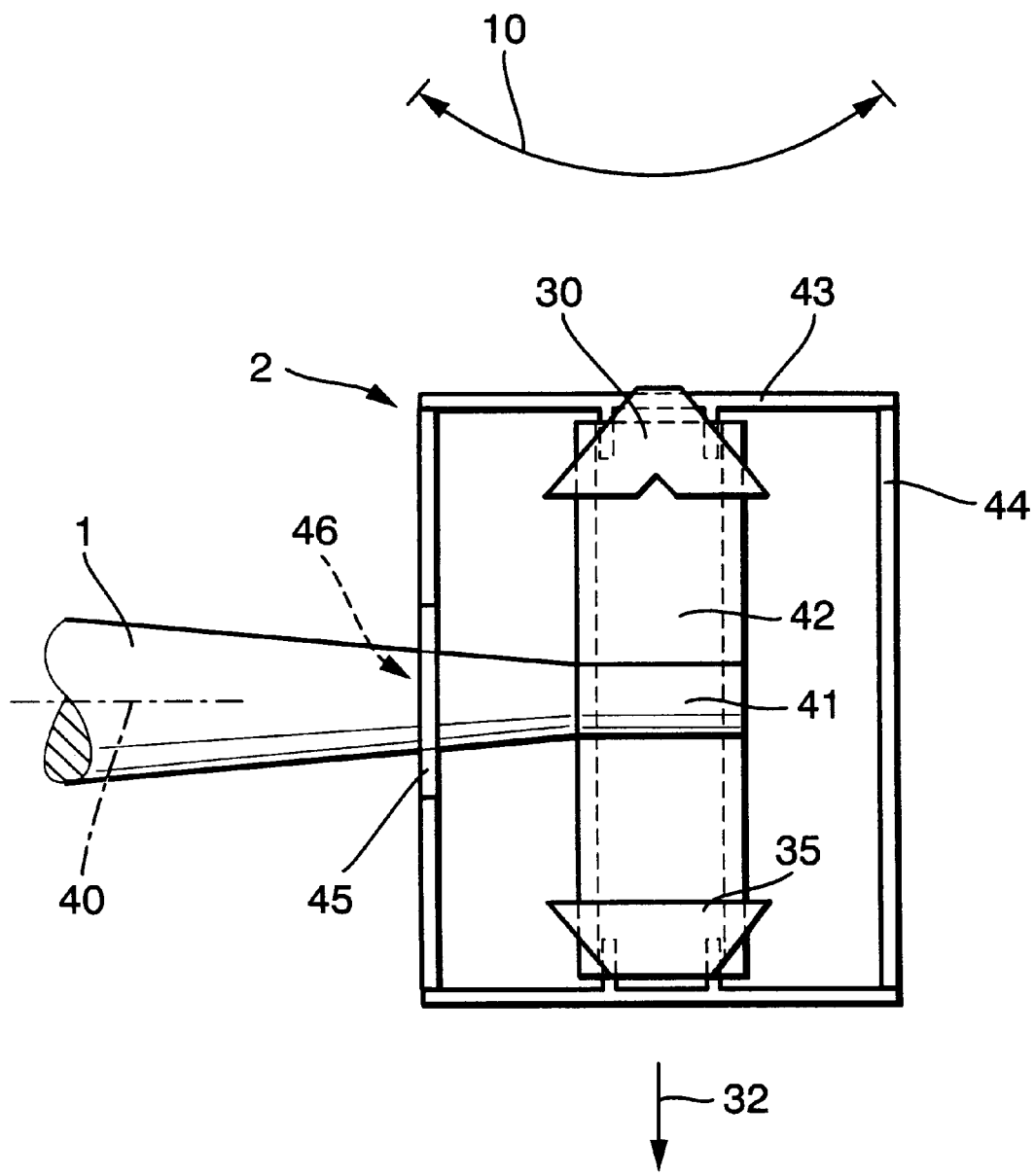

Finally, FIG. 5 shows a plan view of a pedal with shoe latches, in accordance with a third specimen model of the invention. This pedal is similarly equipped to the pedal shown in FIG. 3. There is, however, the difference that the transverse shaft 1 is itself supported by bearings so that it can rotate around its axis 40. At its end, the transverse shaft 1 has an annular shoulder 41 through which a hollow tube 42 is inserted that is supported by bearings in the annular shoulder 41. The hollow tube 42 can thus pivot around its axis as indicated by the double arrow 10.

The pedal strips 43 are fastened to the hollow tube 42, for example by being inserted into the hollow tube 42, and are connected to a pedal surface via longitudinal supports 44. The longitudinal support 44 on the inner side of the bicycle displays a central swelling 45 with a transversely running opening 46 to allow the transverse shaft 1 to be led through. The opening 46, which cannot be directly discerned in FIG. 5, is, for example, oval in the vertical direction, so that the transverse shaft 1 can move within this slit with respect to the axis of the hollow tube 42. Thus, the swelling 45, together with the upper and lower edges of the opening, forms two stops that prevent excessive twisting of the hollow tube 42 in the washer 41, and thus prevent excessive tipping of the pedal.

The preferably adjustable but otherwise fixed forward latch 35 is now set in the direction of travel 32 on the pedal. The rearward latch 30 is positioned opposite the forward latch 35. By means of a bearing not shown in FIG. 5, the rearward latch 30 can be tilted around an axis running parallel with the axis 40. The user of the pedal can thus insert the toe of his foot into the latch 35 and then fix the shoe with the help of the rearward latch 30. In a similar way to FIG. 4, the rearward latch 30 is fastened to a spring not shown in FIG. 5. This design of a pedal as shown in FIG. 5 displays the production-engineering advantage that a single spring is sufficient to implement the function. This single spring extends through the entire hollow tube 21 and, at each of its two ends, the end of the latching lever lying opposite a rearward latch 30 is fastened. By this means, the pedal can be used on both sides. The unused latch 30 forms the abutment for the spring when the heel of a shoe is inserted into the other latch 30. The adjustment of the spring force can be performed with a single spindle, since this force is equal for the symmetrically arranged latches regardless of a rotation of the pedal through 180 degrees.

We claim:

1. A securing system between a shoe having a connector and a bicycle pedal connected via a crank arm to a bicycle, comprising:

a pedal stem positioned on the crank and oriented generally perpendicularly to the crank arm;

a pedal body (24, 25, 43, 44) rotatable freely around the pedal stem (1), the pedal body having at least one additional degree of freedom of movement with respect to the crank arm;

the pedal body having a first connecting element that is detachably connectable to the shoe, the first connecting element including:
   a movable locking clip (30); and
   a fixed latch (35);

a tube oriented along a first axis generally perpendicularly to the pedal stem and (21) rotatably supported on the pedal stem, the tube being at least partially enclosed by the pedal body and having a plurality of hollow ends;

the pedal body (2, 24, 25) having a plurality of inside bearings (3) that project into the plurality of hollow ends of the tube (21, 42) allowing the pedal body to rotate about the first axis, the engagement between the plurality of inside bearings and the tube resulting in the additional degree of freedom of movement for the bod relative to if crank arm;

at least one spring (28) is located in the tube and has at least one outwardly extending end which contacts the movable locking clip (30) of the first connecting element;

the fist connecting element being engaged with the pedal body (2, 25) such that the first connecting element is biased by the at least one spring (28) into engagement with the shoe (6) and such that the pedal body (2) is biased by the at lest one spring against pivoting around the tube.

2. The securing system of claim 1 wherein two springs (28) are provided, one of the two springs being located in each of the plurality of hollow ends of the tube.

3. The securing system claim 1, further comprising:

the pedal body having an additional first connecting element mounted on an opposite side of the pedal body from the other first connecting element;

the tube being hollow;

the at least one spring comprises a single spring which extends through the tube, such that the outwardly extending ends of the single spring contact the moveable locking clips (30) of the first connecting element and the additional connecting element (30) such that the moveable locking clips are biased by the single spring to latch into the shoe.

4. The securing system of claim 1, wherein stops (36, 37, 45, 46) are provided on the pedal body (2, 25) that limit pivoting of the pedal body (2) around the tube.

* * * * *